United States Patent
Zichettello et al.

(10) Patent No.: US 10,131,215 B2
(45) Date of Patent: Nov. 20, 2018

(54) FLEXIBLE TONNEAU COVER ASSEMBLY

(71) Applicant: Honda Motor Co., Ltd., Tokyo (JP)

(72) Inventors: Alexander Zichettello, Hilliard, OH (US); Douglas R Kaltenmark, Powell, OH (US); Michael T Binfet, Bellefontaine, OH (US); Brock J Stull, Columbus, OH (US); Babuji K Tamarapoo, Powell, OH (US)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 15/472,478

(22) Filed: Mar. 29, 2017

(65) Prior Publication Data

US 2018/0281573 A1 Oct. 4, 2018

(51) Int. Cl.
*B60J 7/12* (2006.01)
*B60J 7/10* (2006.01)
*B60J 10/86* (2016.01)

(52) U.S. Cl.
CPC .............. *B60J 7/12* (2013.01); *B60J 7/104* (2013.01); *B60J 7/1291* (2013.01); *B60J 10/86* (2016.02)

(58) Field of Classification Search
CPC ............................................... B60J 7/12
USPC ............................................... 206/100.15
See application file for complete search history.

(56) References Cited

U.S. PATENT DOCUMENTS

| | | | |
|---|---|---|---|
| 4,563,034 A | 1/1986 | Lamb | |
| 5,934,735 A * | 8/1999 | Wheatley | B60J 7/102 296/100.01 |
| 6,293,608 B1 | 9/2001 | Dicke et al. | |
| 6,575,520 B1 | 6/2003 | Spencer | |
| 6,619,719 B1 | 9/2003 | Wheatley | |
| 6,719,353 B1 | 4/2004 | Isler et al. | |
| 6,752,449 B1 | 6/2004 | Wheatley | |
| 6,808,220 B2 | 10/2004 | Wheatley | |
| 6,808,221 B2 | 10/2004 | Wheatley | |
| 6,811,203 B2 | 11/2004 | Wheatley | |
| 6,814,388 B2 | 11/2004 | Wheatley | |
| 6,893,073 B2 | 5/2005 | Wheatley | |
| 7,607,714 B2 | 10/2009 | Wheatley | |
| 7,954,876 B2 | 6/2011 | Kosinski | |
| 8,714,622 B2 | 5/2014 | Spencer et al. | |
| 8,857,887 B1 | 10/2014 | Schmeichel | |
| 2014/0246877 A1 | 9/2014 | Spencer et al. | |

* cited by examiner

*Primary Examiner* — Dennis H Pedder
(74) *Attorney, Agent, or Firm* — Honda Patents & Technologies North America, LLC; Mark E. Duell

(57) ABSTRACT

A flexible tonneau cover assembly includes a pair of side rails positioned on side walls of a cargo box of a motor vehicle, two sliding elements slidably received in the side rails, spring blocks inserted within each side rail, and a spring located between the sliding element and the spring block in each side rail. The flexible tonneau cover assembly also includes a front rail including a first end having an opening for receiving a projection of the first sliding element, and a second end having a latch receivable by the latch receptacle of the second sliding element. A tonneau cover is attached to the front rail and extends to cover the cargo box of the vehicle, which is tensioned by the springs.

17 Claims, 24 Drawing Sheets

FLEXIBLE TONNEAU COVER ASSEMBLY

TECHNICAL FIELD

The embodiments described related to the field of tonneau covers for motor vehicles.

BACKGROUND

Tonneau covers are generally used to cover the cargo box of a vehicle, such as a pick-up truck. A typical tonneau cover includes a cover sheet made of a flexible, waterproof material, and a frame structure to which the cover sheet is removably attached. Such tonneau cover assemblies can be problematic. For example, such frame structures often extend into the cargo space, and some covers can be opened from the exterior of the cargo box even with the tailgate closed.

APPLICATION SUMMARY

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

According to one aspect, a flexible tonneau cover assembly includes a side rail positioned on a side wall of a cargo box of a motor vehicle, a sliding element slidably received in the side rail, a spring block inserted within the side rail, and a spring located between the sliding element and the spring block in the side rail.

According to another aspect, a flexible tonneau cover assembly includes a first side rail positioned on a first side wall of a cargo box of a vehicle, the first side rail including a first sliding element slidably received in the first side rail, the first sliding element having a projection extending laterally inward from the first side rail, a first spring block inserted within the first side rail, and a first spring located between the first sliding element and the first spring block in the first side rail. The flexible tonneau cover assembly further includes a second side rail positioned on a second side wall of the cargo box of the vehicle, the second slide rail including a second sliding element slidably received in the second side rail, the second sliding element having a laterally inward facing latch receptacle, a second spring block inserted within the second side rail, and a second spring located between the second sliding element and the second spring block in the side rail. The flexible tonneau cover assembly also includes a front rail including a first end having an opening for receiving the projection of the first sliding element, and a second end having a latch receivable by the latch receptacle of the second sliding element. A tonneau cover is attached to the front rail and extends to cover the cargo box of the vehicle.

According to yet another aspect, a flexible tonneau cover assembly includes a side rail positioned on a side wall of a cargo box of a motor vehicle, a sliding element slidably received in the side rail, a spring block inserted within the side rail, a spring located between the sliding element and the spring block in the side rail, a front rail removably attached to the sliding element, and a flexible tonneau cover having a front end attached to the front rail.

The figures depict various embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

Figure 1:
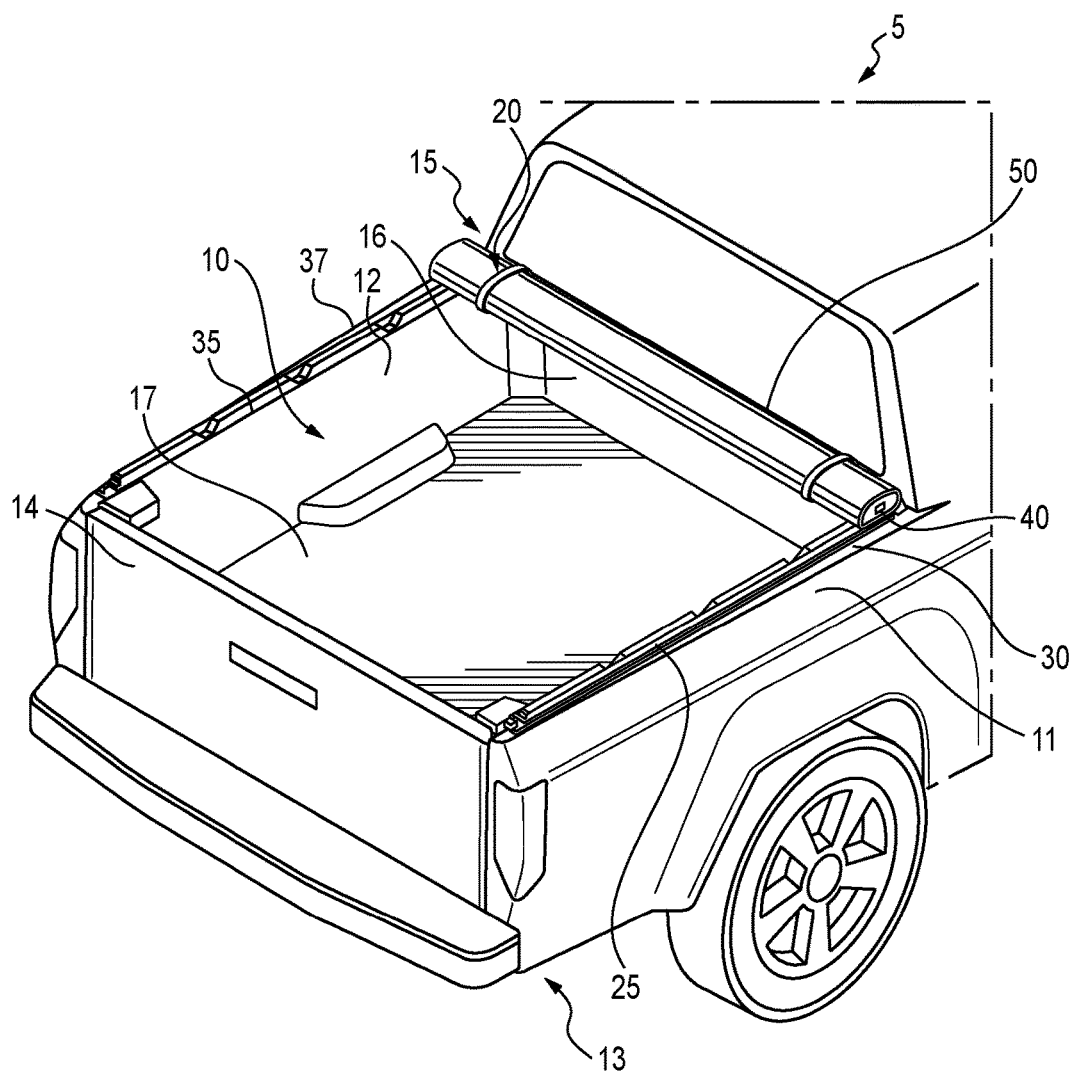
FIG. 1 is rear perspective view of a portion of a vehicle with a flexible tonneau cover assembly.
Figure 2:
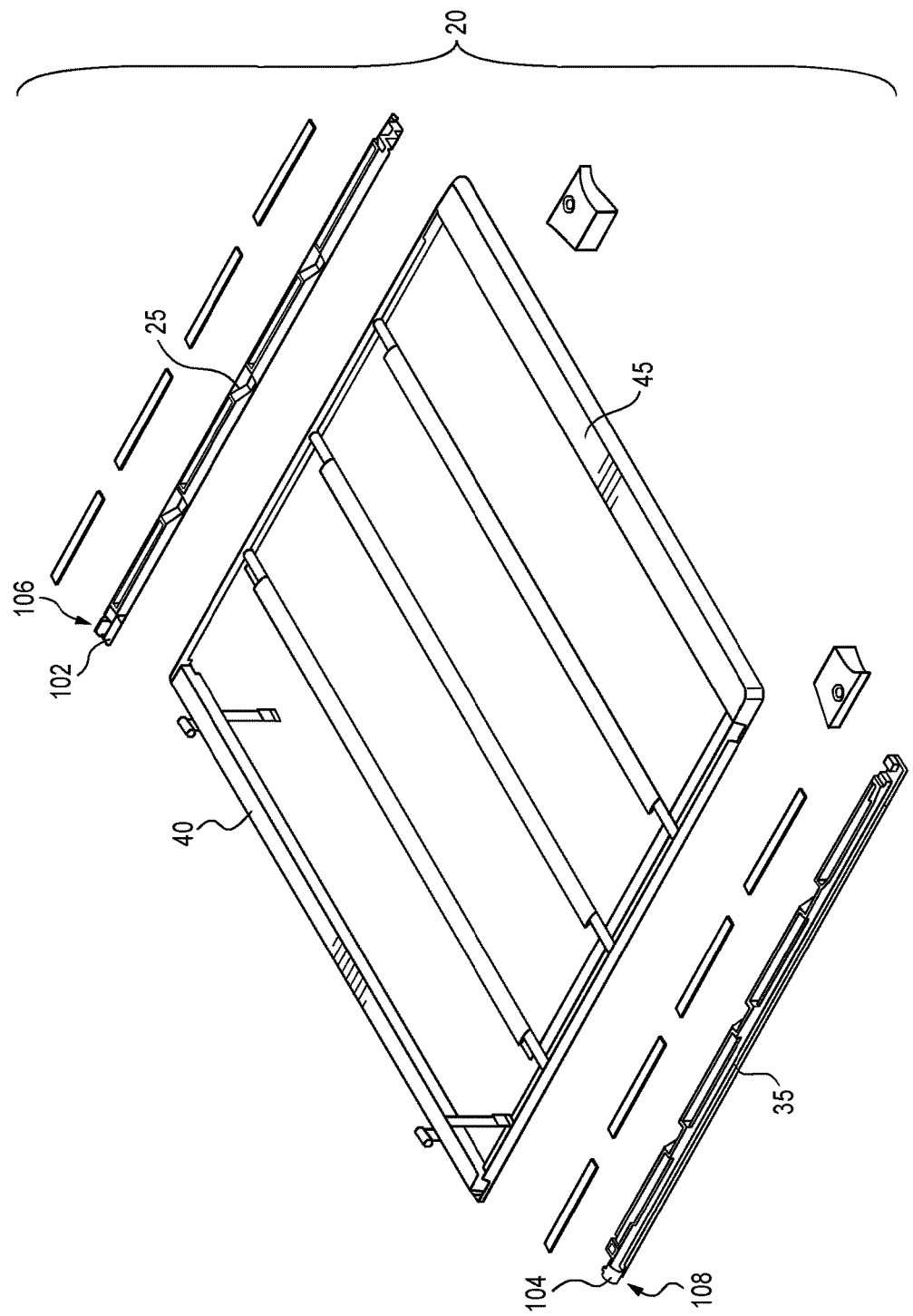
FIG. 2 is a perspective exploded view of the flexible tonneau cover assembly.
Figure 3:
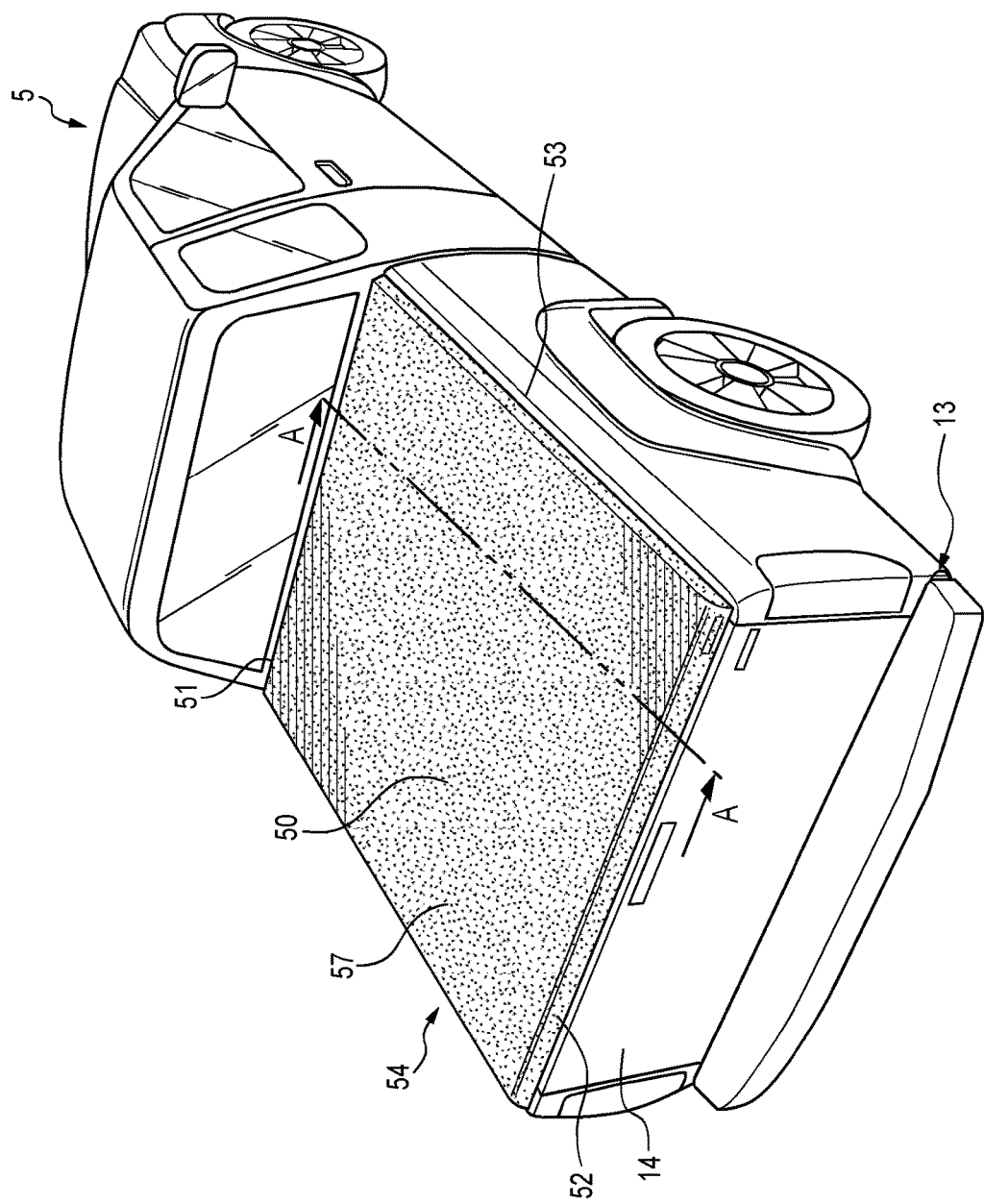
FIG. 3 is rear perspective view of a vehicle with the flexible tonneau cover assembly in a closed position.
Figure 4:
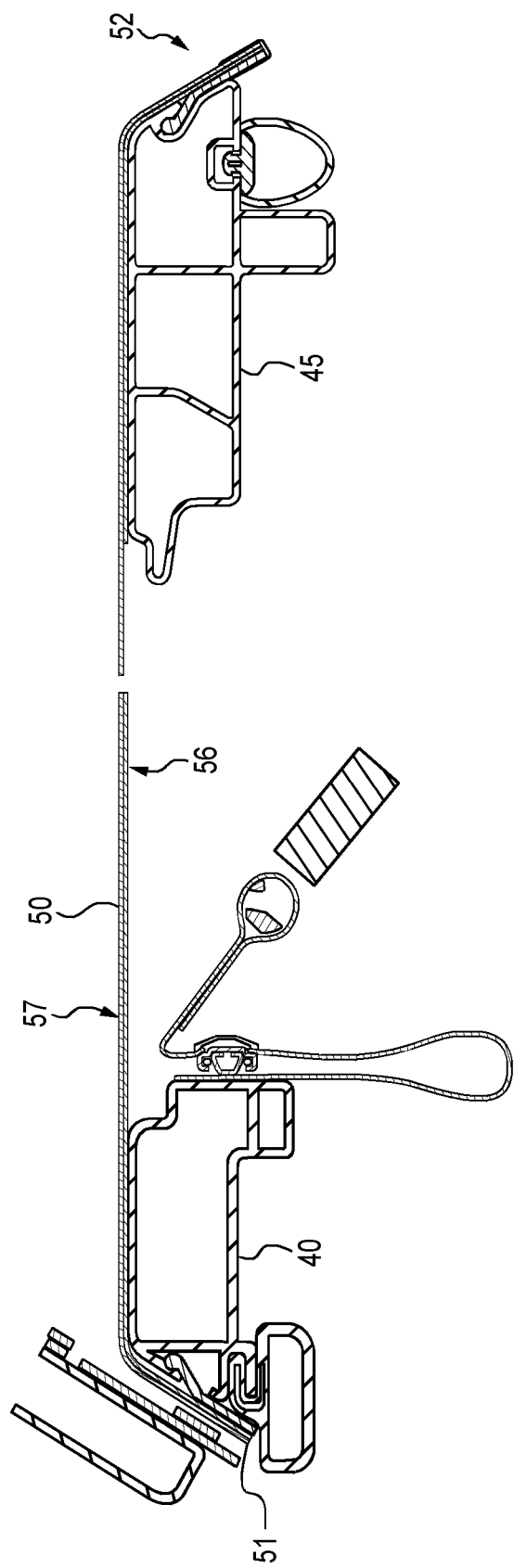
FIG. 4 is a cross-section of the flexible tonneau cover assembly of FIG. 3 along line A-A.
Figure 5:
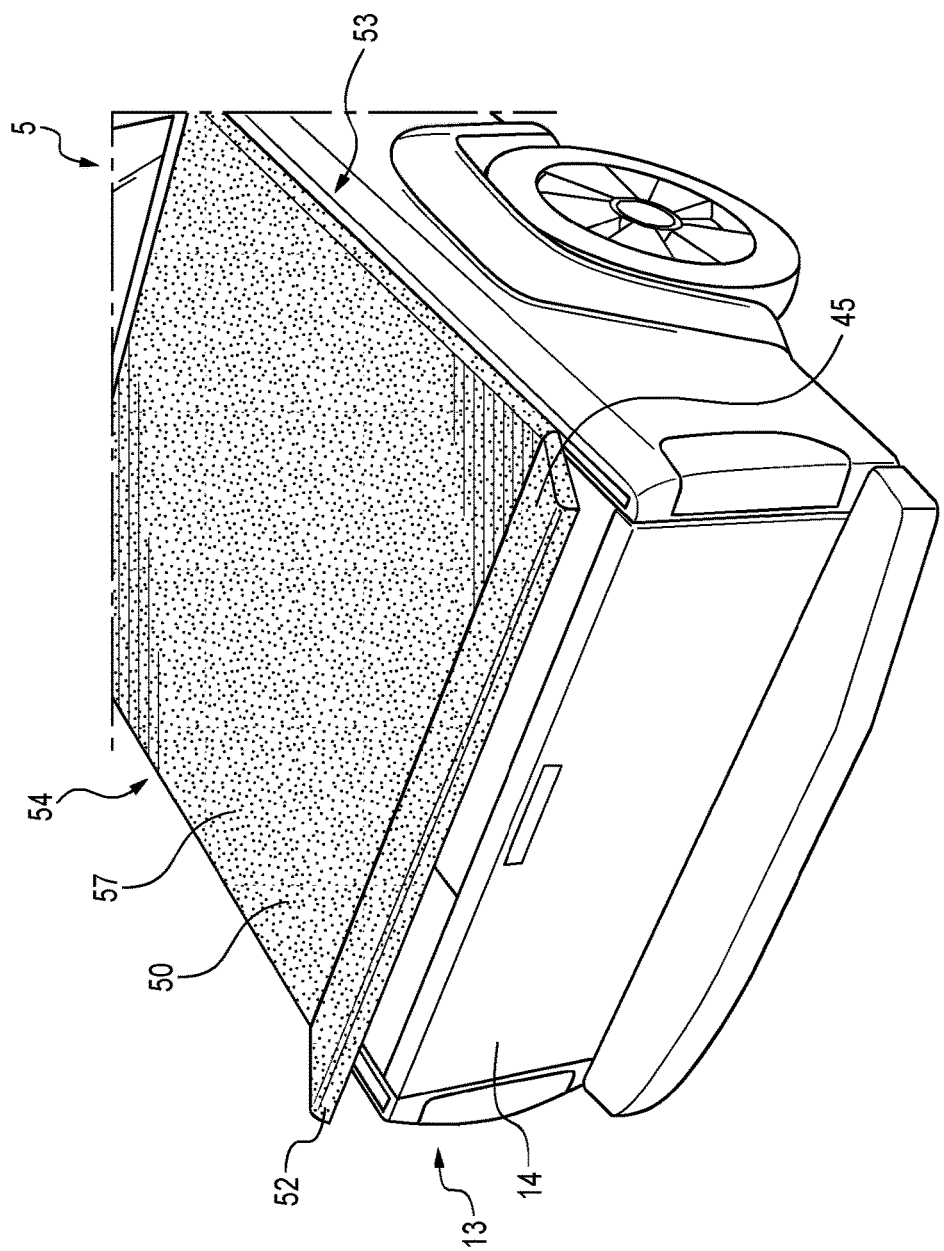
FIG. 5 is rear perspective view of the vehicle with the flexible tonneau cover assembly in an open position.
Figure 6:
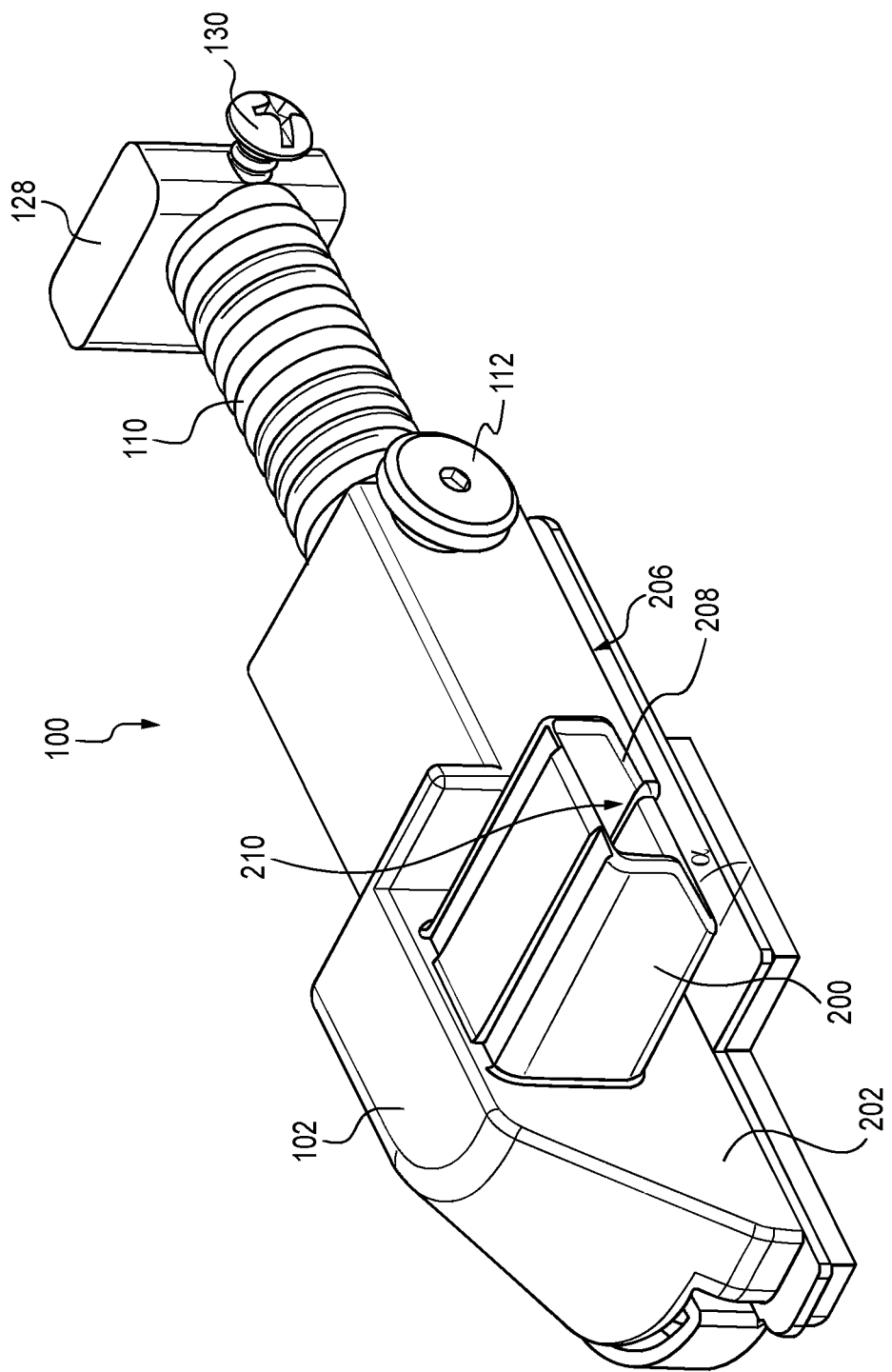
FIG. 6 is a perspective view of a sliding element for use with the flexible tonneau cover assembly.

As shown in FIG. 1, a vehicle 5 is provided that includes a cargo box 10 defined by a first side wall 11, a second side wall 12, a rearward end 13 including a tailgate 14, a forward end 15 including a front wall 16, and a bed 17. In general, as shown in FIGS. 1 and 2, a flexible tonneau cover assembly 20 is provided that includes a first side rail 25 positioned on or adjacent an upper surface 30 of the first side wall 11, a second side rail 35 positioned on or adjacent an upper surface 37 of the second side wall 12, a front rail 40 positioned at the forward end 15 of the cargo box 10, a rear rail 45 positioned at the rearward end 13 of the cargo box 10, and a flexible tonneau cover 50. As shown in FIGS. 3 and 4, the flexible tonneau cover 50 includes a forward end 51 secured to the front rail 40, a rearward end 52 secured to the rear rail 45, a first side 53 that extends from the forward end 51 of the flexible cover 50 to the rearward end 52 of the flexible cover 50, a second side 54 that extends from the forward end 51 of the flexible cover 50 to the rearward end 52 of the flexible cover 50, a downwardly facing surface 56, and an upwardly facing surface 57. The rear rail 45 is movable between a closed position as shown in FIG. 3 and an open position as shown in FIG. 5.

As shown in FIGS. 6-9, the front rail 40 may be biased by a separate tensioning system 100 toward the forward end 15 of the cargo box 10. The tensioning system 100 may include a first sliding element 102 that is movably secured to a forward end 106 of the first rail 25, shown in FIG. 2, and a second sliding element 104 movably secured to a forward end 108 of the second rail 35. The sliding elements 102, 104 are biased longitudinally forward from the forward ends 106, 108 of the respective side rails 25, 35 by, for example, a spring 110 located within each of the side rails 25, 35.

A shoulder bolt 112, or any other suitable fastener such as a screw or rivet, may be inserted through a slot 114 in the first side rail 25 and is received in a rearward portion 116 of the first sliding element 102 that is positioned inside the forward end 106 of the first side rail 25. The shoulder bolt 112 and the slot 114 serve to movably secure the sliding element 102 to the first side rail 25 and allow for the range of movement of the first sliding element 102 to be limited by the length of the slot 114. A shoulder bolt 112 may also be inserted through a slot 124 in the second side rail 35 and is received in a rearward portion 126 of the second sliding element 104 that is positioned inside the forward end 108 of the second side rail 35. The shoulder bolt 112 and the slot 124 serve to movably secure the second sliding element 104 to the second side rail 35 and allow for the range of movement of the second sliding element 104 to be limited by the length of the slot 124.

Each spring 110 is further attached or fixedly inserted into a spring block 128. Each spring block 128 in turn rests against a stay 120 located within each of the side rails 25, 35 that prohibits the spring block 118 and attached spring 110 from receding into the side rails 25, 35. Each spring block 128 may also include a fastener 130, such as a screw, bolt, or any other suitable fastener, that attaches each the spring block 128 to the respective side rails 25, 35.

Figure 7:
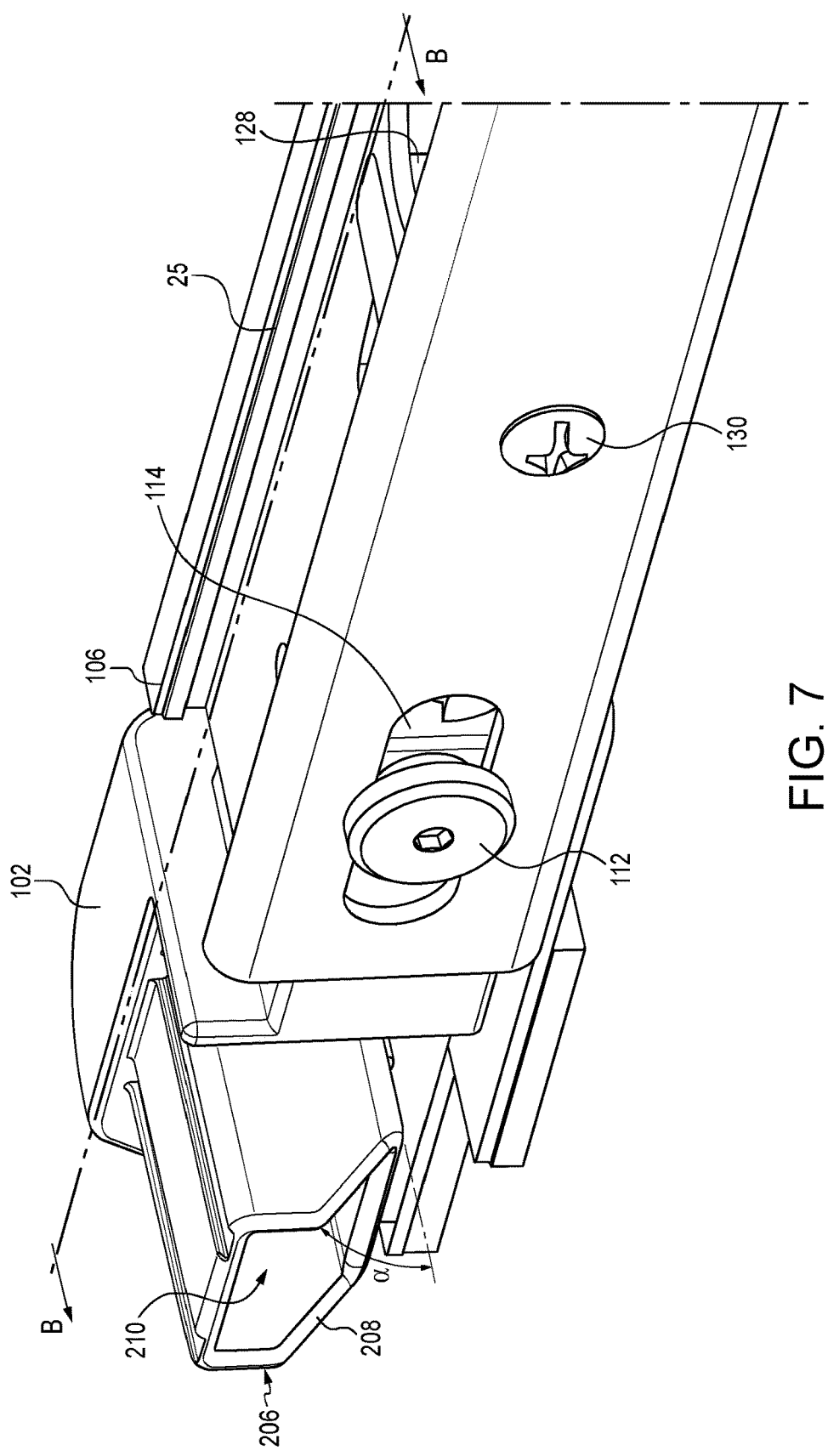
FIG. 7 is a perspective view of a first sliding element inserted into a first side rail of the flexible tonneau cover assembly.
Figure 9:
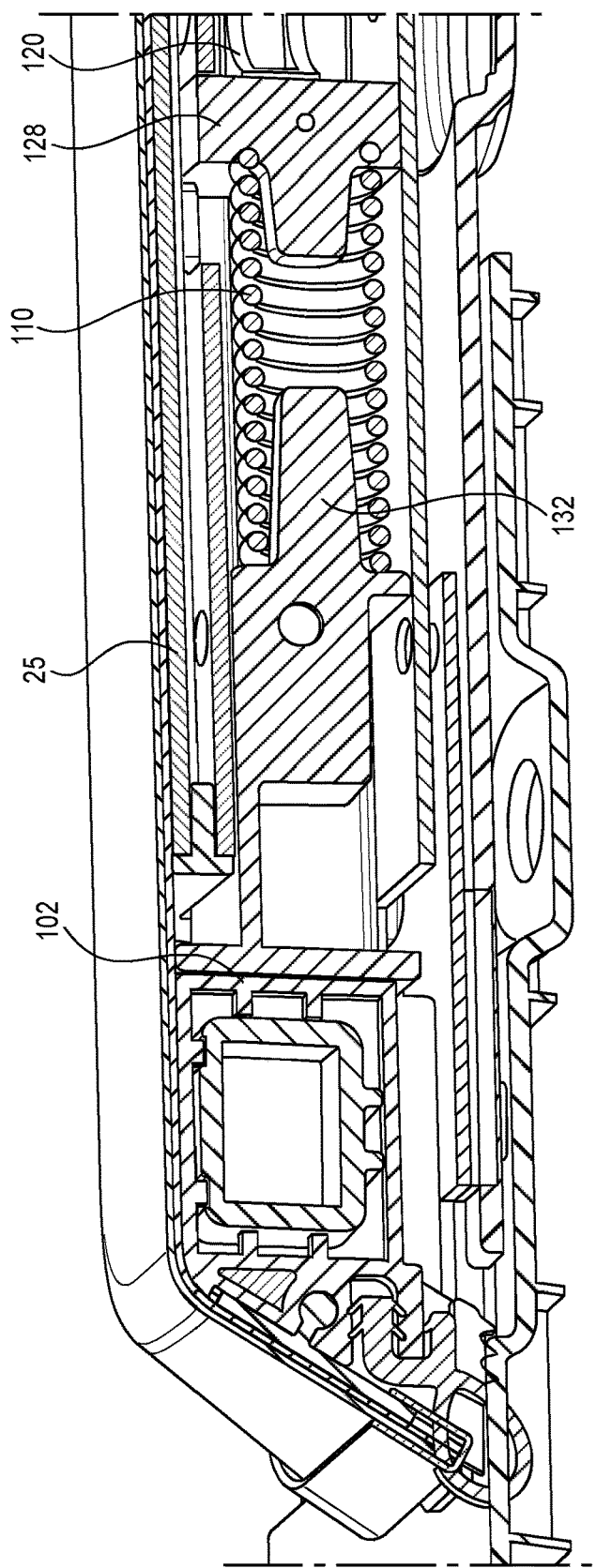
FIG. 9 is a cross-section of the first sliding element inserted into the first side rail of the flexible tonneau cover assembly of FIG. 7 along line B-B.

FIG. 9, which is a cross section along line B-B in FIG. 7, illustrates one embodiment of the sliding element 102 which includes an extension 132 that is inserted within the spring 110. The extension 132 ensures the sliding element 102 remains seated within the spring 110.

Figure 10:
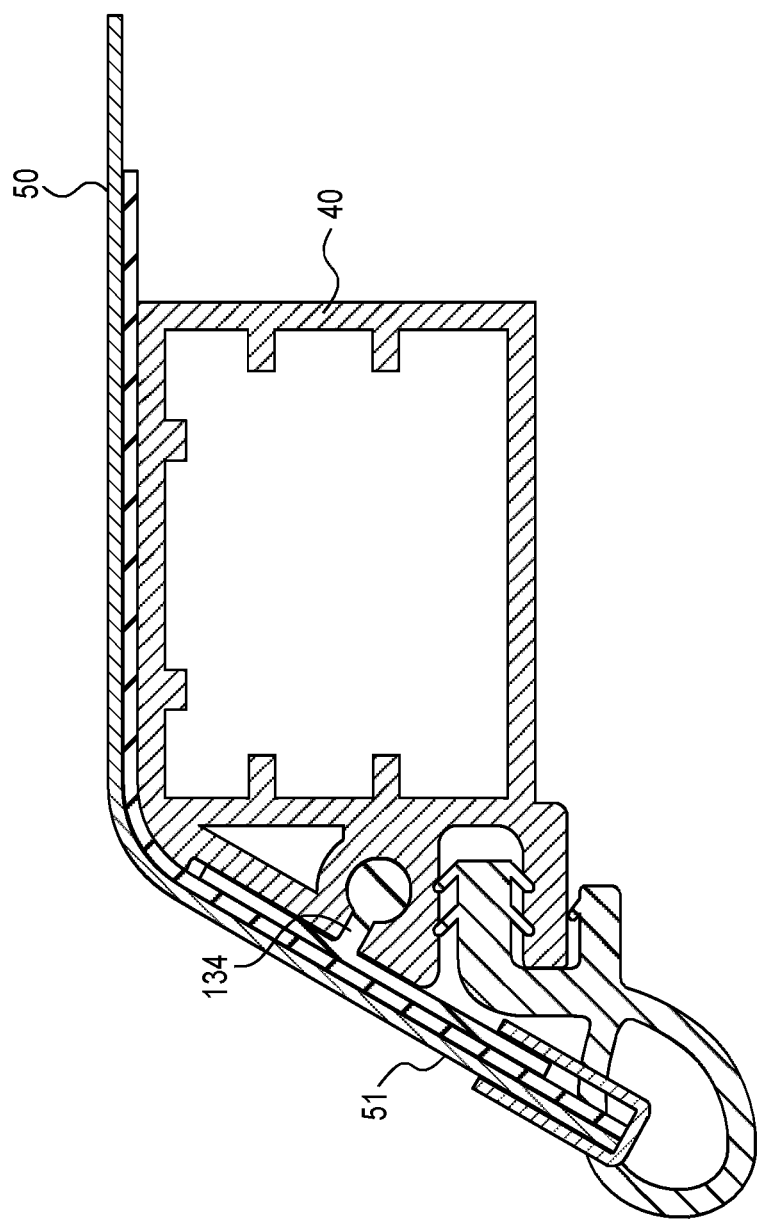
FIG. 10 is a cross-sectional view of a front rail of the flexible tonneau cover assembly.

As illustrated in greater detail FIG. 10, the forward end 51 of the flexible tonneau cover 50 is attached to the front rail 40 by a retainer 134 or any other suitable method known to one skilled in the art, and the rearward end 52 of the flexible tonneau cover 50 is attached to the rear rail 45 as shown in FIGS. 3-4.

Figure 11:
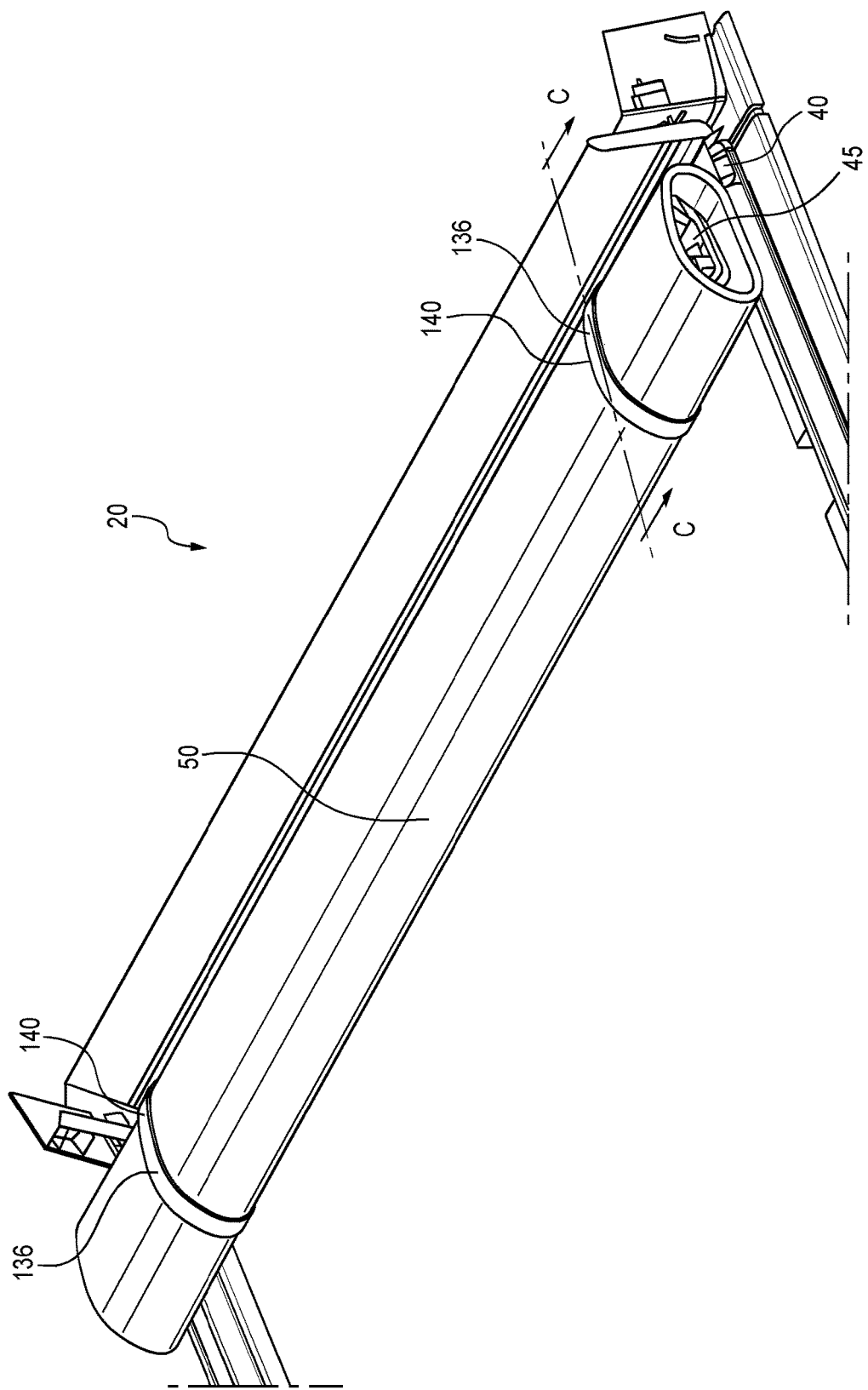
FIG. 11 is a perspective view of an embodiment of the flexible tonneau cover assembly in which the flexible tonneau cover is rolled up.

As illustrated in FIG. 11, the flexible tonneau cover 50 may in turn be rolled up around the rear rail 45 in a longitudinally forward direction until the flexible tonneau cover 50 and the rear rail reach 45 the front rail 40. The flexible tonneau cover 50 is equipped with fasteners 136 of the kind known to those skilled in the art.

Figure 12:
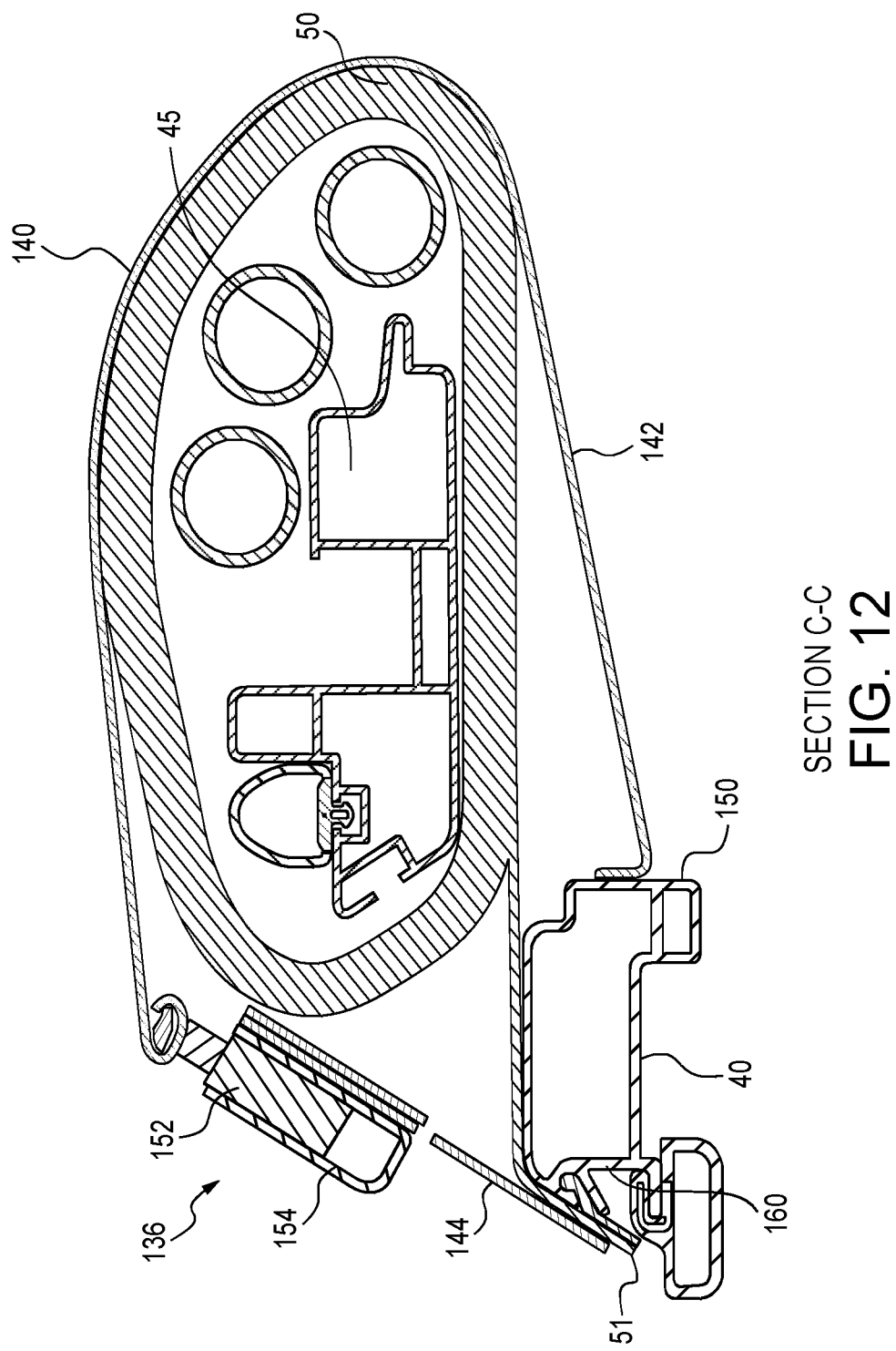
FIG. 12 is a cross-section of the flexible tonneau cover assembly of FIG. 11 along line C-C.
Figure 13:
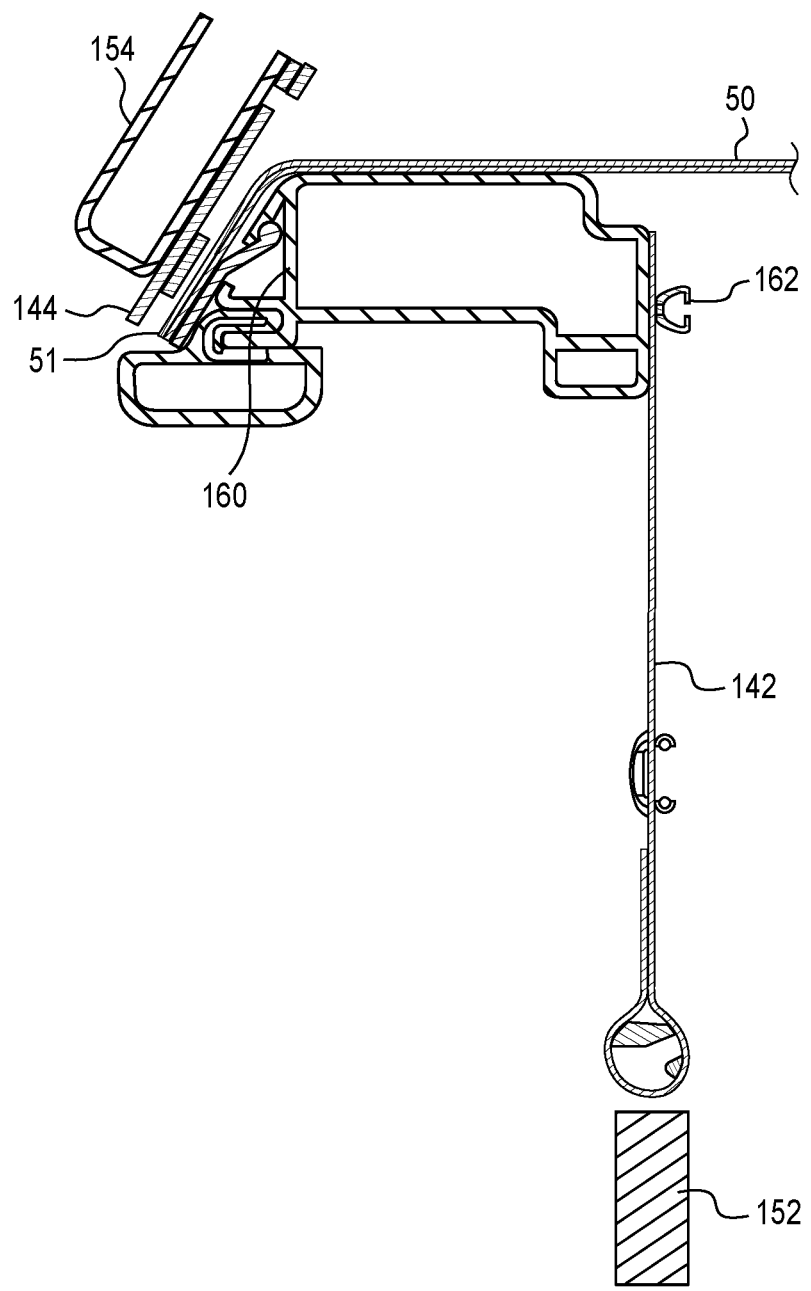
FIG. 13 is a cross-sectional view of the front rail of the flexible tonneau cover assembly with a strap in a loose position.
Figure 14:
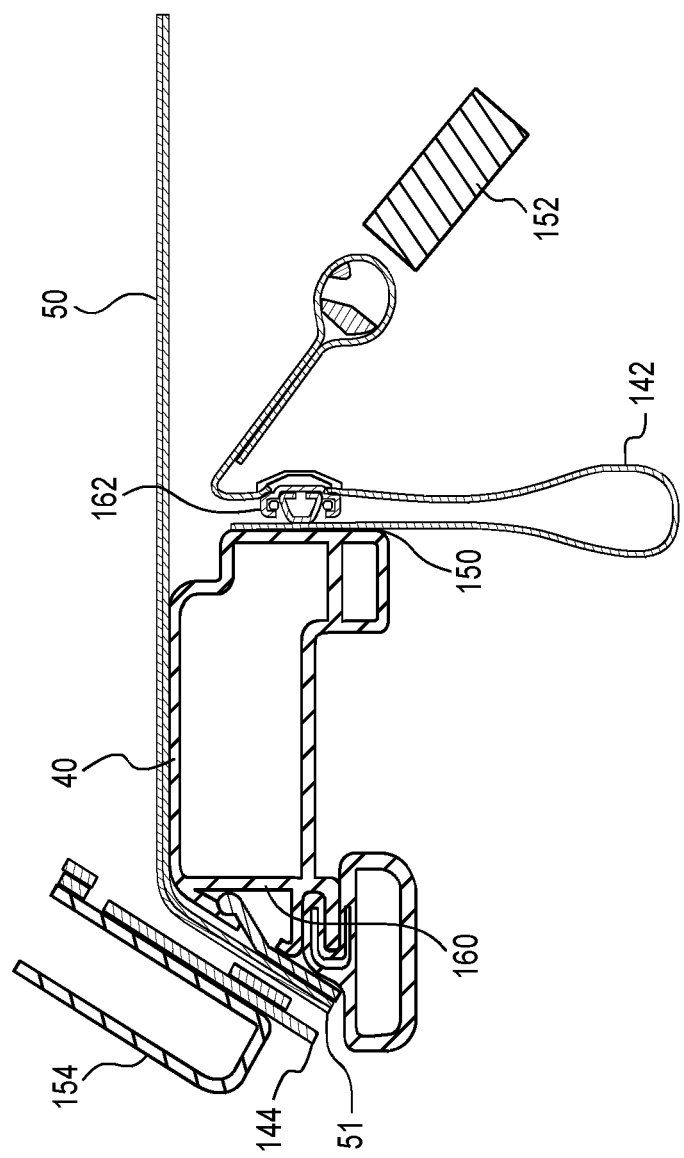
FIG. 14 is a cross-sectional view of the front rail of the flexible tonneau cover assembly with a strap in a clipped position.

With respect to FIGS. 11-14, one embodiment of the fastener 136 is disclosed. When the flexible tonneau cover 50 is rolled up, at least one strap 140, which includes a first strap portion 142 attached to a longitudinally rearward side 150 of the front rail 40 with a male clip 152 pulled tight and inserted into a second strap portion 144 with a female clip 154 attached to the forward end 51 of the flexible tonneau cover 50 and the longitudinally forward side 160 of the front rail 40. When the flexible tonneau cover 50 is unrolled, illustrated in FIGS. 13-14, the first strap portion 142 may be allowed to dangle as shown in FIG. 13, or may be secured by a clip 162 to prevent rattling as shown in FIG. 14. In the embodiment illustrated in FIG. 11, the rolled flexible tonneau cover 50 has two straps 140.

Figure 15:
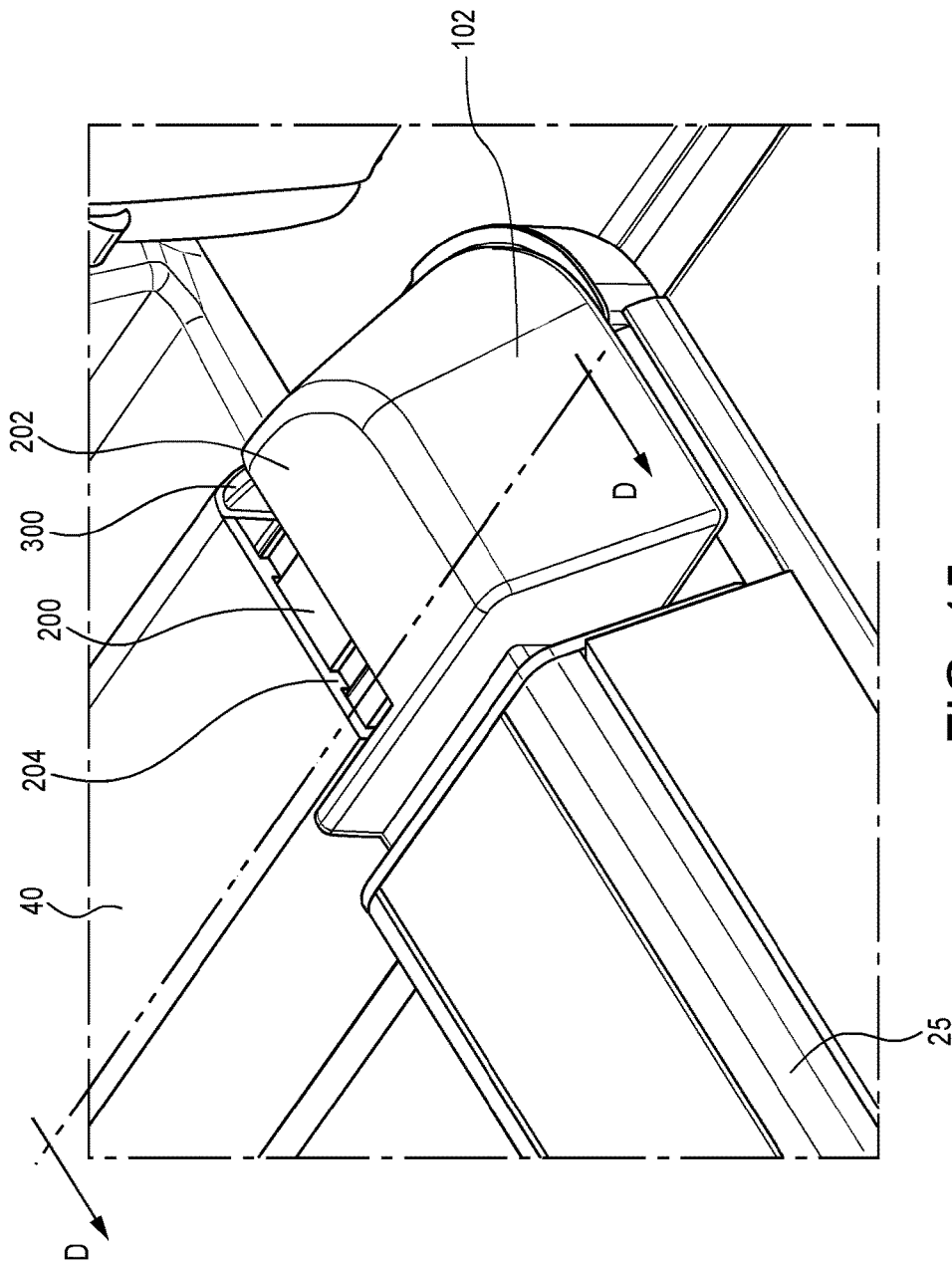
FIG. 15 is a perspective view of a first end the front rail engaged with a sliding element of the flexible tonneau cover assembly.
Figure 16:
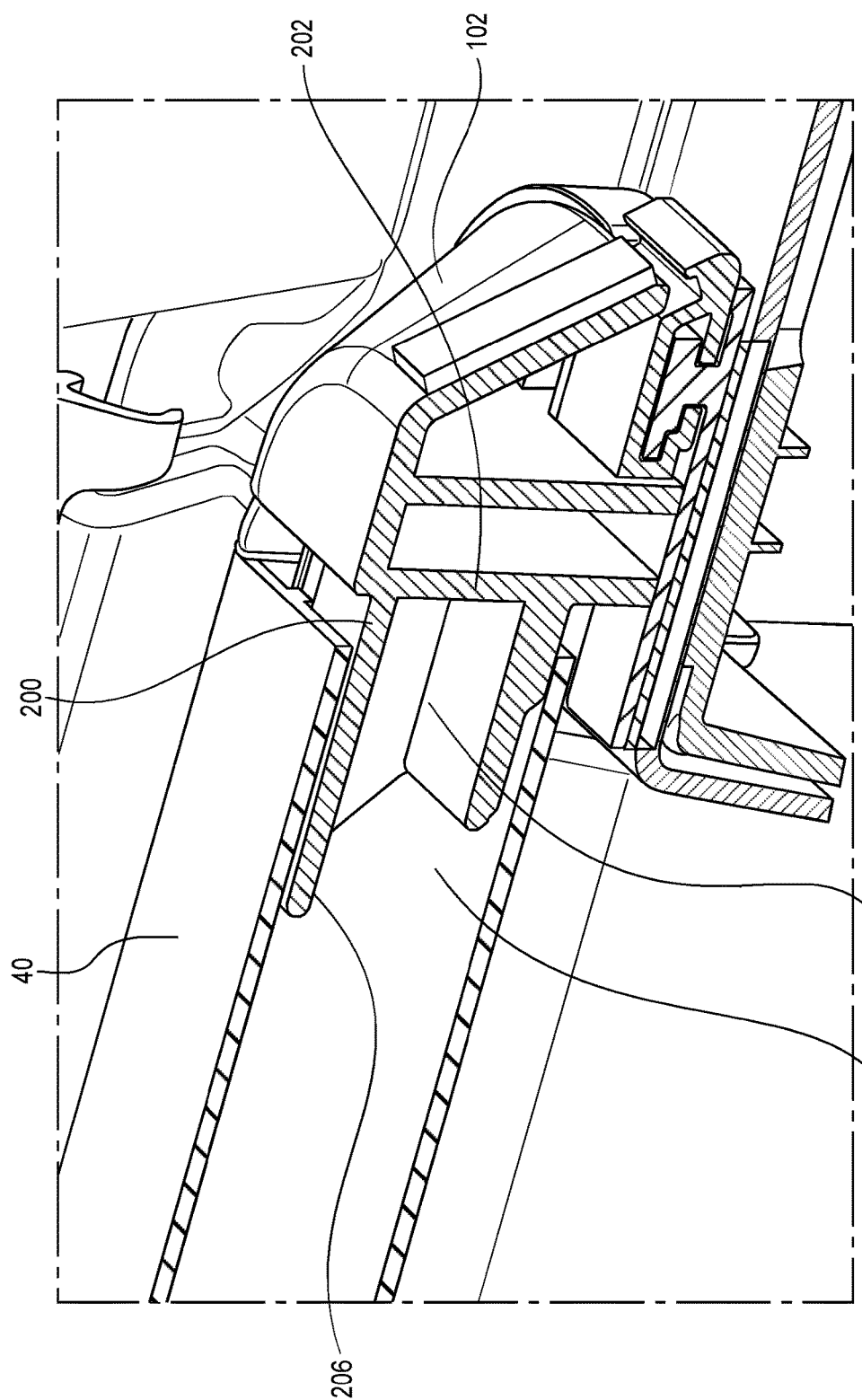
FIG. 16 is a cross-section of the flexible tonneau cover assembly of FIG. 15 along line D-D.

Referring again to FIGS. 6-7, the first sliding element 102 may include a projection 200 that extends laterally inward from the body 202 of the first sliding element 102. The projection 200 may extend inward between 2-10 cm, preferably about 5-6 cm. As illustrated in FIGS. 15-16, The forward rail 40 includes a female first end 204 designed to receive the projection 200 that extends laterally inward from the first sliding element 102 when the front rail 40 is installed. The distal end 206 of projection 200 may also include a sloped distal surface 208 on the lower half of the distal end 206 of the projection 200 to allow the front rail 40 to become engaged with the projection 200 at an angle α between 30-60°. As illustrated, the lower half of the distal surface 208 has a slope of approximately 45°. The projection 200 may be a solid piece, or as illustrated in FIG. 16, the projection 200 may have a hollow central portion 210 to reduce weight.

Figure 8:
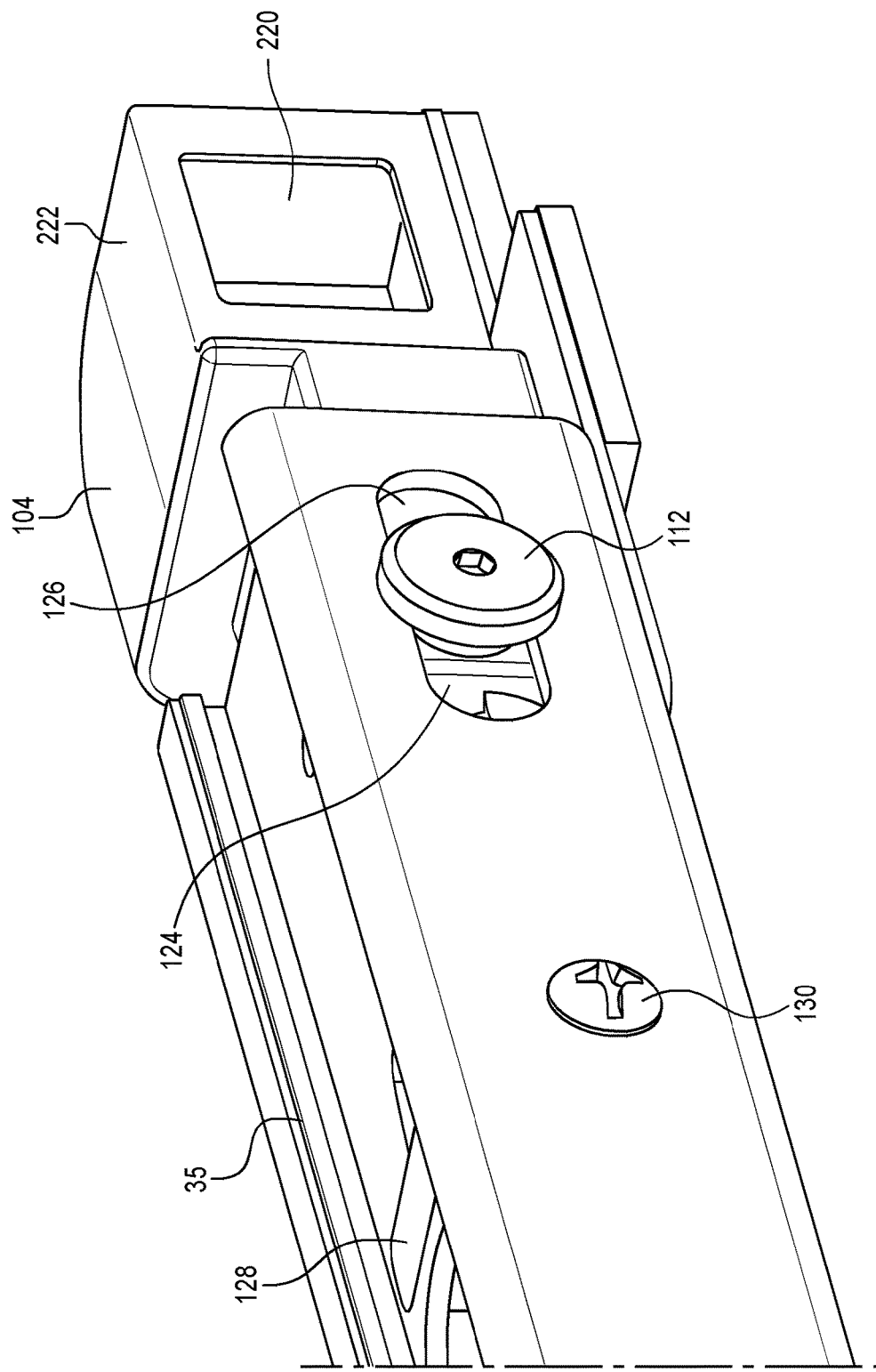
FIG. 8 is a perspective view of a second sliding element inserted into a second side rail of the flexible tonneau cover assembly.
Figure 17:
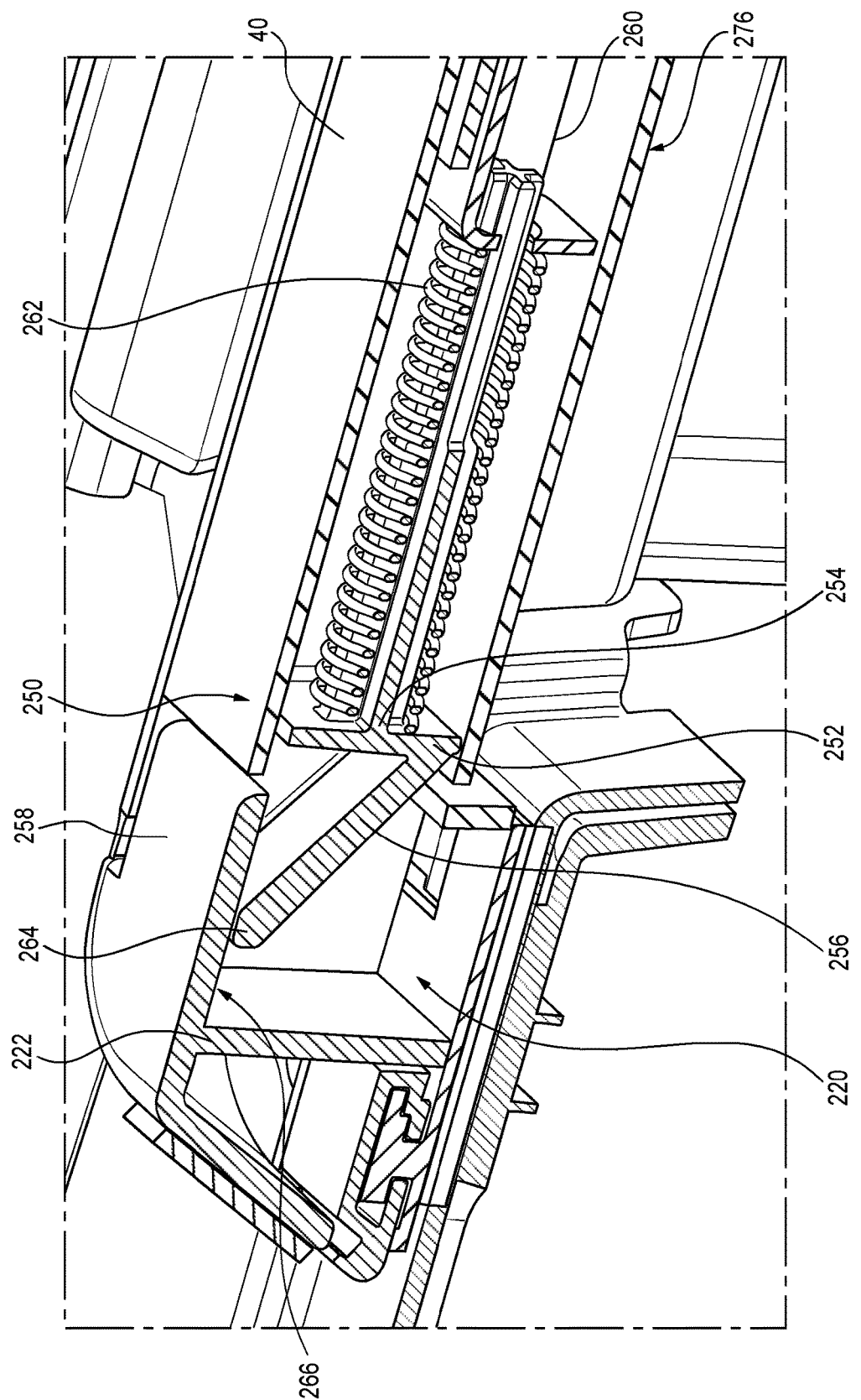
FIG. 17 is a cross-section of a second end of the front rail of the flexible tonneau cover assembly including a latch engaged with the second sliding element.
Figure 18:
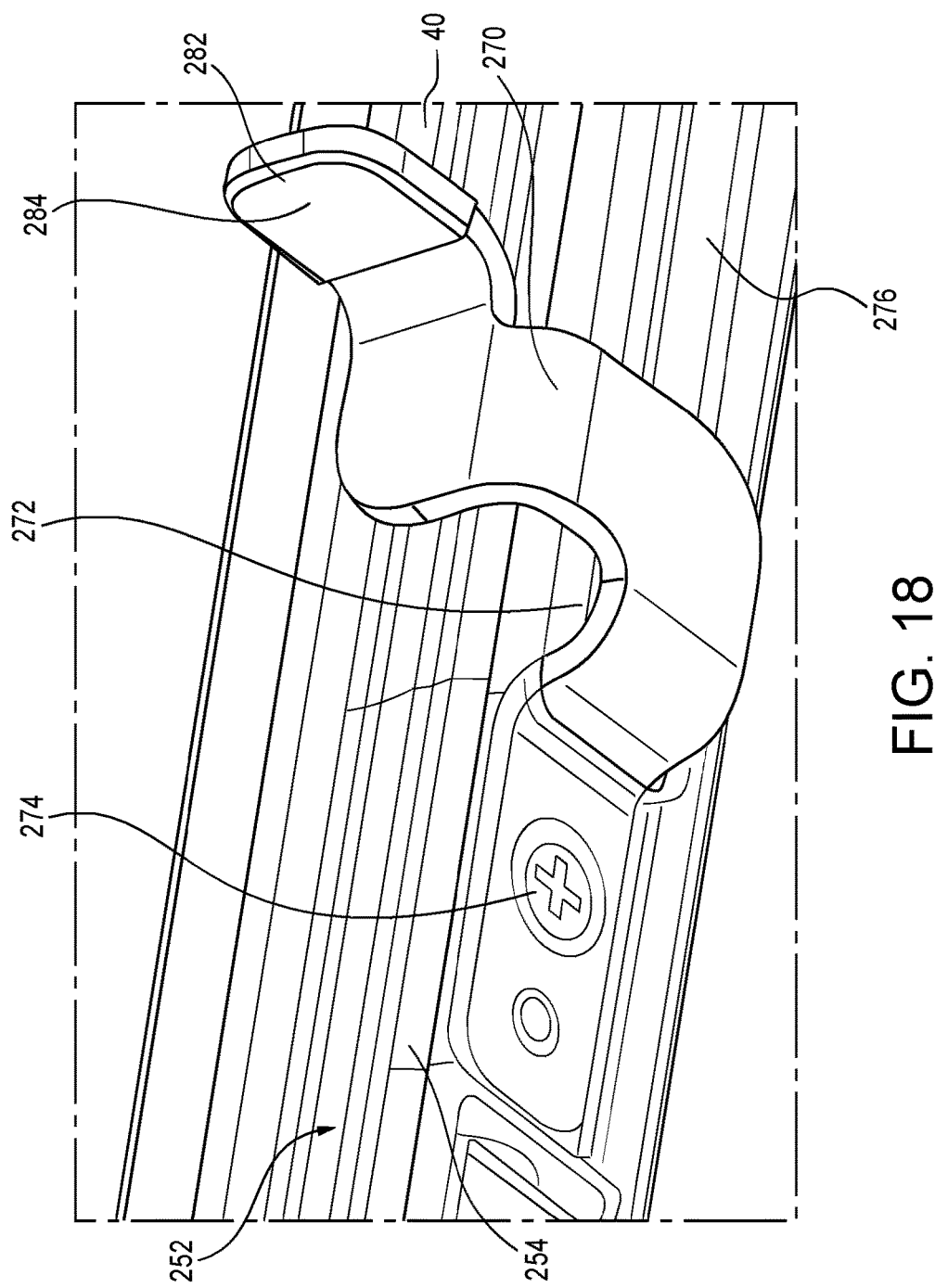
FIG. 18 is a transparent perspective bottom view of a portion of the front rail with a latch handle.
Figure 19:
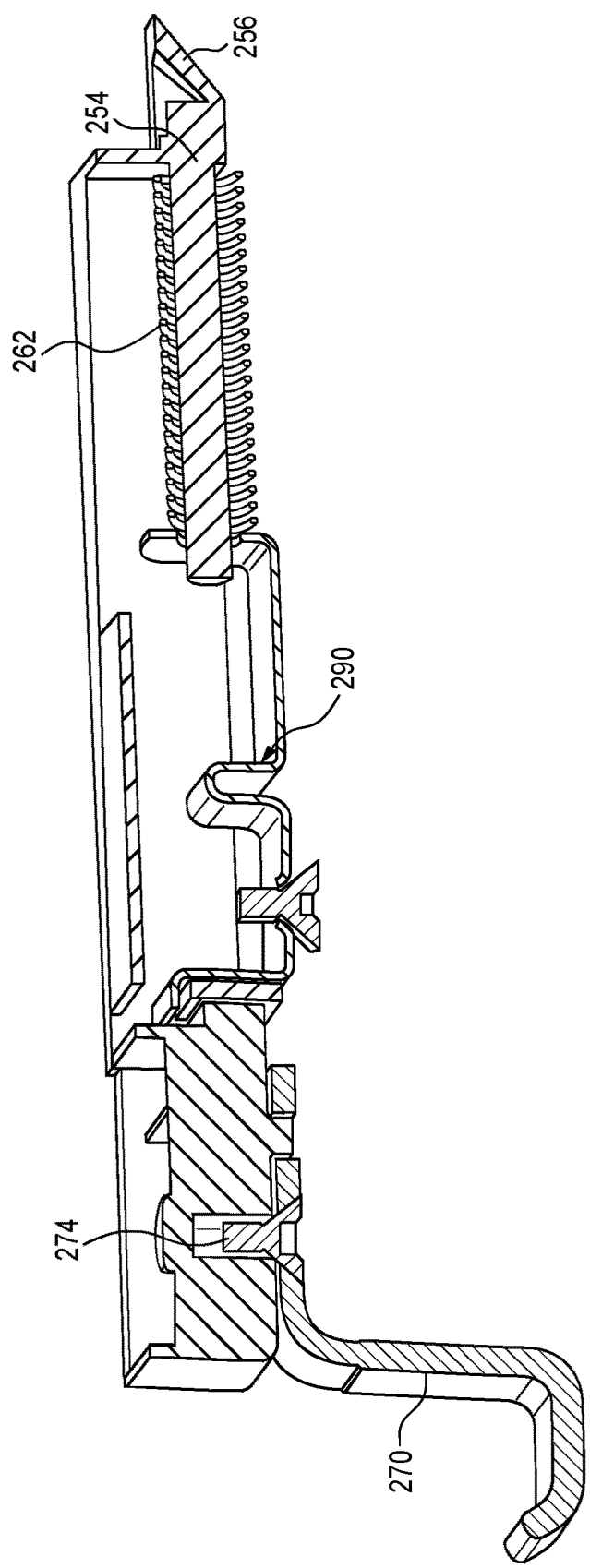
FIG. 19 is a cross-sectional view of the latch within the front rail.
Figure 20:
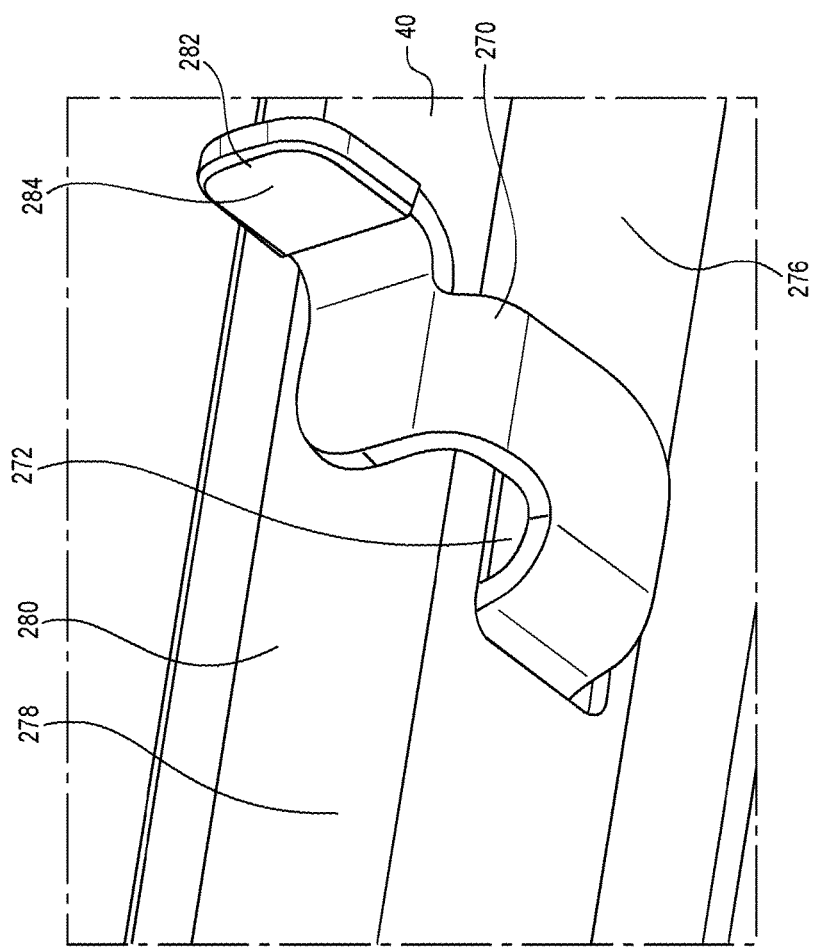
FIG. 20 is a perspective bottom view of the portion of the front rail with the latch handle.

As illustrated in FIG. 8, the second sliding element 104 may include a receptacle 220 in the body 222 of the second sliding element 104 opened laterally inward from the body 222 of the second sliding element 104. As illustrated in FIGS. 17-20, the front rail 40 has a second end 250 with a latch 252. The latch 252, as shown in FIG. 17, includes a base 254 and upwardly and laterally outward sloping engagement surface 256. As the front rail 40 is installed into the receptacle 220 in the body 222 of the of the second sliding element 104, the engagement surface 256 engages with the upper surface 258 of the second sliding element 104. As the engagement surface 256 is pushed downward, the engagement surface 256 forces the base 254 to move laterally inward into the body 260 of the front rail 40, pushing against a latch spring 262 that is biased laterally outward toward the second end 250 of the front rail 40. When the distal end 264 of the engagement surface 256 passes the upper surface 258 of the second sliding element 104, the latch spring 262 pushes the sloped surface 256 outward into the receptacle 220, and the distal end 264 of the engagement surface 256 engages with an inner surface 266 of the receptacle 220 in the second sliding element 104, creating an interference fit that prohibits removal of the latch 252 from the receptacle 220. In the illustrated embodiment, the spring constant of the latch spring 262 is between 1000-1300 N/m, and more specifically 1140 N/m.

Figure 21:
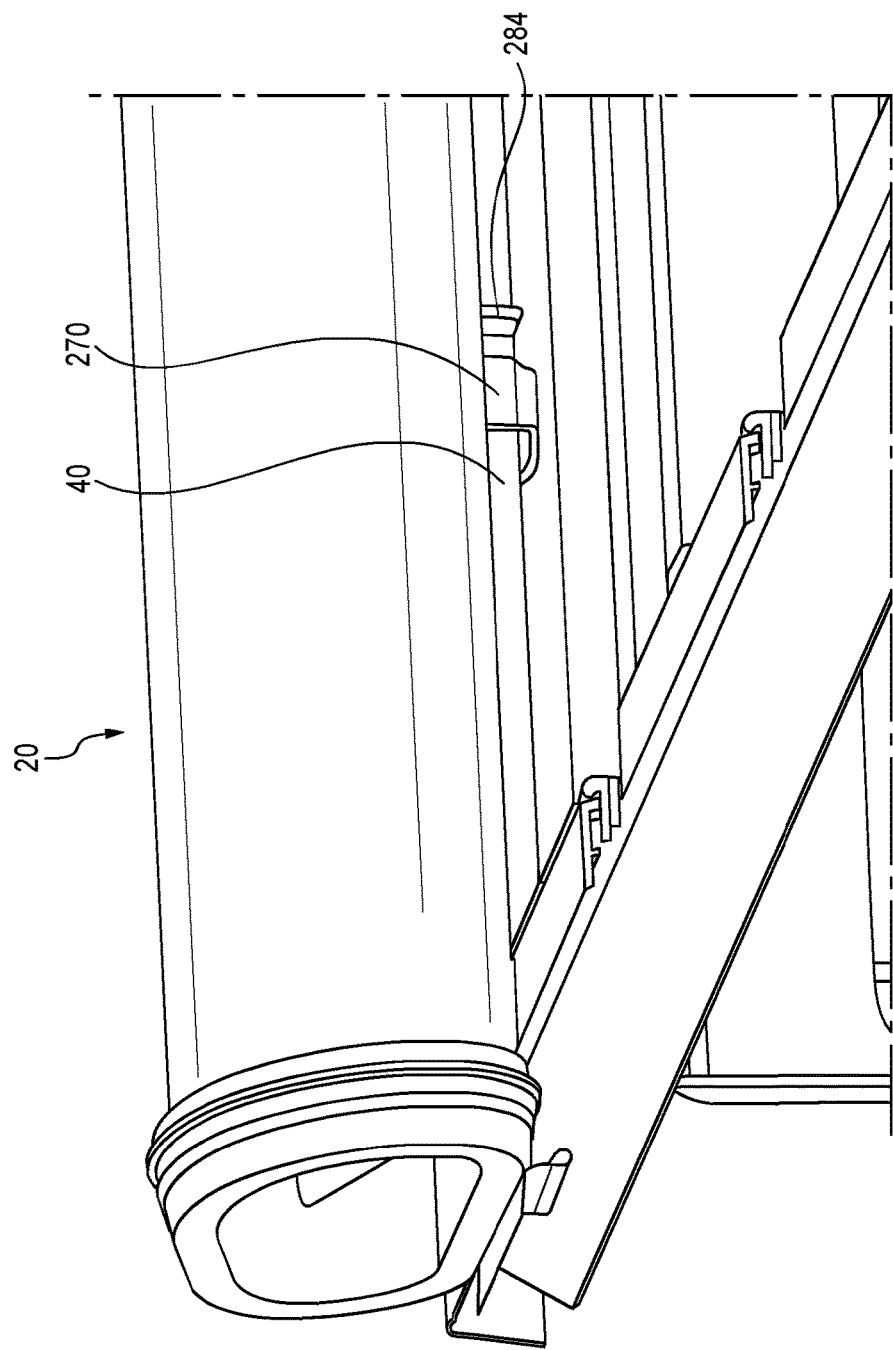
FIG. 21 is rear view of a portion of the rolled up flexible tonneau cover.

A handle 270 is attached to the base 254 to disengage the latch 252 from the receptacle 220. The handle 270 may be attached to the base 254 through a slot 272 in the front rail 40 by any suitable attachment method. In the embodiment illustrated in FIGS. 18-19 the handle is attached by screw 274. The motion of the handle 270 may be limited by the dimensions of the slot 272 to prevent damage to the spring 262. In the embodiment illustrated in FIG. 19, the movement of the base 254 may be limited by the presence of a stop 290 to protect the spring 262. Additionally, lateral movement of the handle itself is illustrated in the embodiment illustrated in FIGS. 18, 20-21. The slot 272 is located on a bottom surface 276 of the front rail 40 to prevent debris from entering the front rail 40 which may inhibit the function of the latch 252. The handle 270 wraps around the outer surface 278 of front rail 40 such that the distal end 282 of the handle 270 extends rearward of the rear side 280 of the front rail 40. The distal end 282 of the handle 272 may include a plastic or rubber cover 284 to ease engagement of the handle 270 by a user. The positioning of the distal end 282 of the handle 270 provides an ergonomically advantageous position for the user, and also limits exposure of the handle to cargo in the cargo box 10 of the vehicle 5.

When the front rail 40 is engaged with the sliding elements 102, 104, and the rear rail 45 is placed in the closed position, as illustrated in FIGS. 3-4, the springs 110 push the sliding elements 102, 104 and the front rail 40 toward the forward end 15 of the cargo box 10 to apply a desired amount of tension in the flexible cover 50 between the front rail 40 and the rear rail 45. In the illustrated embodiment, the springs 110 have a spring constant between 7500-8500 N/m, and more specifically 7880 N/m. The springs 110 ensure that flexible tonneau cover 50 remains taut in the event of elongation or shrinkage, depending on variable weather conditions, such as wet versus dry conditions, warm versus cold air temperatures, or natural changes to the material related to age and usage. With the flexible tonneau cover system 20, the flexible tonneau cover 50 may be maintained taut within variations in the length of the fabric of +/−15 mm.

To remove the tonneau cover assembly 20, the tonneau cover 50 is rolled up and secured as illustrated in FIGS. 11-12. The front rail 40, with the tonneau cover 50 rolled up and secured as discussed above, is removed by the user disengaging the latch 252 by pushing the handle 270, removing the engagement surface 256 from the receptacle 220, lifting the second end 250 of the front rail 40, and pulling the front rail 40 off of the projection 200 of the first sliding element 102. Therefore, this design allows for installation and removal of the tonneau cover assembly 20 by a single person without the use of tools.

Figure 22:
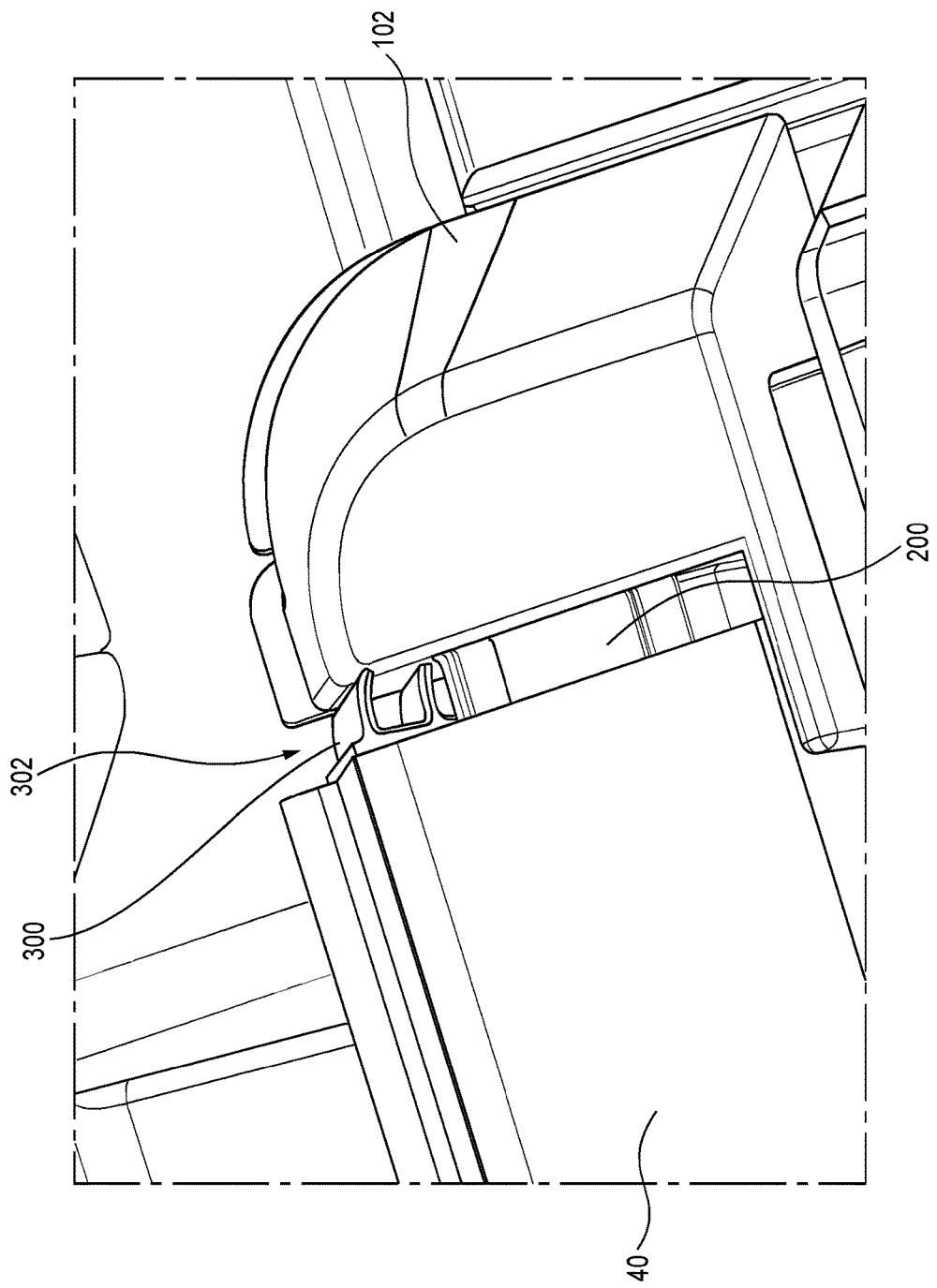
FIG. 22 is a top view of the first front rail engage with the first sliding element and a gap seal therebetween.
Figure 23:
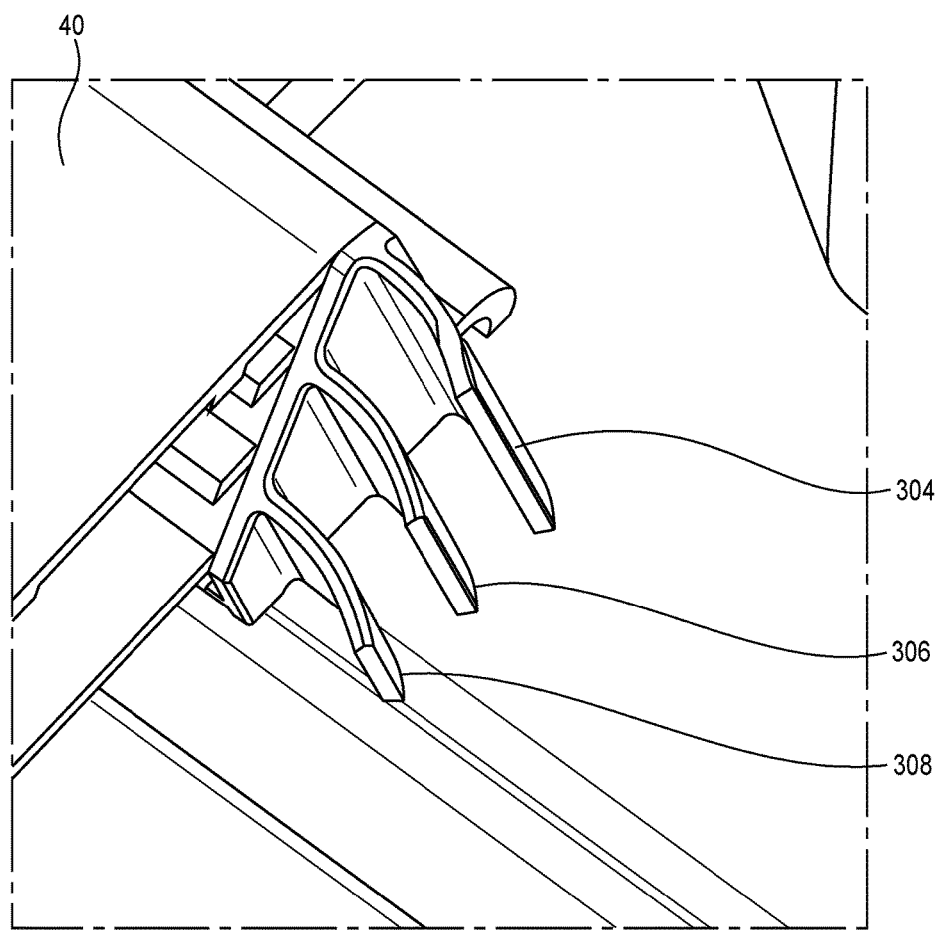
FIG. 23 is a perspective view of the first end of the front rail with the gap seal.
Figure 24:
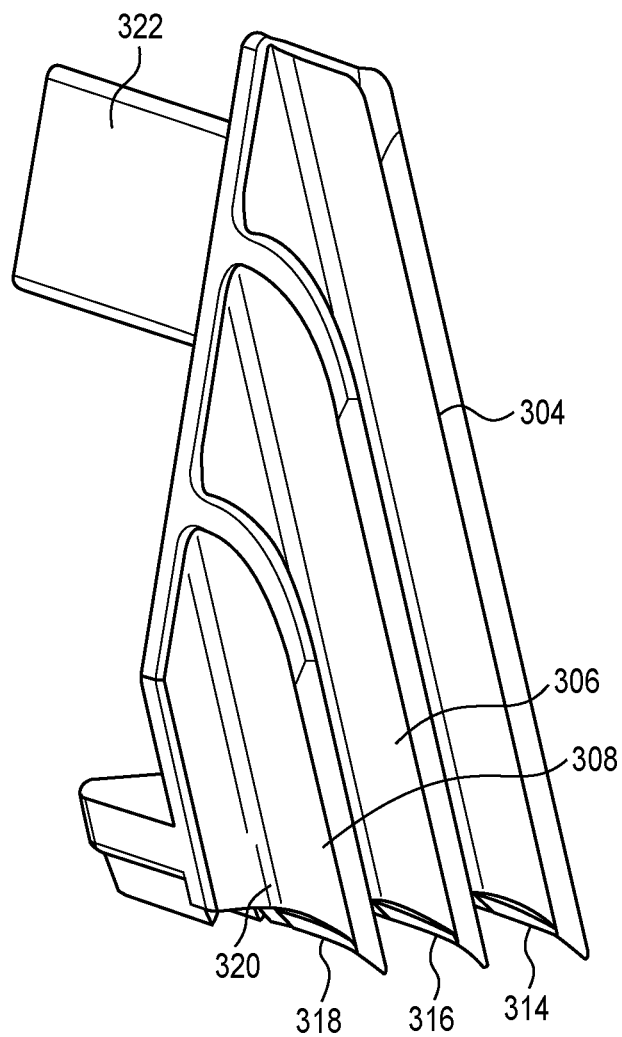
FIG. 24 is a perspective view of the gap seal.

Due to the movement of the sliding elements 102, 104, a gap seal 300 is provided to provide a seal between cargo box 10 and the upper surfaces 30, 37 of the side wall 11, 12 of vehicle 5 in the area of the sliding elements 102, 104. FIGS. 22-24 illustrate one embodiment of the gap seal 300 to provide a seal between the front rail 40 and the sliding element 102. A second, mirror-image of the gap seal 300 is also provided on the second side of the front rail 40 for sealing against sliding element 104. The gap seal 300 seals a gap 302 along the sliding element 102 in both horizontal and vertical planes. The gap seal 300 is a unique rubber molded part that resides between the front rail 40 and the sliding element 102. The gap seal 300 reduces water access to the cargo box 10 by sealing both a vertical plane and horizontal plane using a system of lips 304, 306, 308. The bottoms 314, 316, 318 of the lips 304, 306, 308 contact and seal against a horizontal plane formed by the upper surface 30 of the side wall 11. Additionally, the lips 304, 306, 308 seal against the sliding element 102. The lips 304, 306, 308 contain relief notches 320 in the bottoms 314, 316, 318 of the lips 304, 306, 308 so that the lips 304, 306, 308 can bend in two directions, longitudinally forward and rearward, for improved sealing. The gap seal 300 includes an extension 322 that is seated in the front rail 40, and the gap seal 300 remains with the front rail 40 when the tonneau cover assembly 20 is removed. The gap seal 300 may be applied to seal a gap between any fixed element and sliding element that are on top of a base element.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

What is claimed is:

1. A flexible tonneau cover assembly, comprising:
   a first side rail positioned on a first side wall of a cargo box of a motor vehicle;
   a second side rail positioned on a second side wall of the cargo box of the motor vehicle;
   a sliding element slidably received in each of the first side rail and the second side rail;
   a spring block inserted within each of the first side rail and the second side rail;
   a spring located between the sliding element and the spring block in each of the first side rail and the second side rail;
   a front rail removably attached to the sliding element in each of the first side rail and the second side rail;
   a flexible tonneau cover, a front end of the flexible tonneau cover attached to the front rail;
   a rear rail removably attached to each of the first side rail and the second side rail side rail, a rearward end of the flexible tonneau cover being attached to the rear rail, the tonneau cover being rolled up in a longitudinally forward direction around the rear rail in a stored position; and
   wherein the spring tensions the flexible tonneau cover in a longitudinally forward direction.

2. The flexible tonneau cover assembly of claim 1 further comprising:
   a shoulder bolt attached to the sliding element through a slot in each of the first side rail and the second side rail; and wherein constraining the shoulder bolt in the slot in each of the first side rail and the second side rail limits movement of the sliding element in each of the first side rail and the second side rail.

3. The flexible tonneau cover assembly of claim 2 wherein the spring is attached to the spring block in each of the first side rail and the second side rail.

4. The flexible tonneau cover assembly of claim 3 further comprising:
a fastener attaching the spring block in each of the first side rail and the second side rail, wherein longitudinal movement of the spring block rearward is prevented.

5. The flexible tonneau cover assembly of claim 4 wherein the spring is biased to push sliding element longitudinally forward in each of the first side rail and the second side rail.

6. The flexible tonneau cover assembly of claim 5 wherein the spring is a helical spring in each of the first side rail and the second side rail.

7. The flexible tonneau cover assembly of claim 6 wherein the spring in each of the first side rail and the second side rail has a spring constant between 7,500 N/m and 8,000 N/m.

8. The flexible tonneau cover assembly of claim 7 wherein the spring in each of the first side rail and the second side rail has a spring constant of 7,880 N/m.

9. A flexible tonneau cover assembly, comprising:
a first side rail positioned on a first side wall of a cargo box of a vehicle, the first side rail comprising:
 a first sliding element slidably received in the first side rail, the first sliding element having a projection extending laterally inward from the first side rail;
 a first spring block inserted within the first side rail; and
 a first spring located between the first sliding element and the first spring block in the first side rail;
a second side rail positioned on a second side wall of the cargo box of the vehicle, the second slide rail comprising;
 a second sliding element slidably received in the second side rail, the second sliding element having a laterally inward facing latch receptacle;
 a second spring block inserted within the second side rail; and
 a second spring located between the second sliding element and the second spring block in the side rail;
a front rail, comprising:
 a first end having an opening for receiving the projection of the first sliding element; and
 a second end having a latch receivable by the latch receptacle of the second sliding element;
a tonneau cover attached to the front rail and extendable to cover the cargo box of the vehicle.

10. The flexible tonneau cover assembly of claim 9 further comprising:
a first shoulder bolt attached to the first sliding element through a slot in the first side rail;
a second shoulder bolt attached to the second sliding element through a slot in the second side rail; and
wherein constraining the first and second shoulder bolts in the slots in the first and second side rails limits movement of the first and second sliding elements in the first and second side rails.

11. The flexible tonneau cover assembly of claim 10 wherein the first and second springs are biased to push the first and second sliding elements and the front rail longitudinally forward in the side rail.

12. The flexible tonneau cover assembly of claim 11 wherein the first and second springs are helical springs.

13. The flexible tonneau cover assembly of claim 12 further comprising:
a rear rail attached to a tailgate of the vehicle, the tailgate defining a rear end of the cargo box;
wherein the tonneau cover is detachably connected to the rear rail.

14. A flexible tonneau cover assembly, comprising:
a side rail positioned on a side wall of a cargo box of a motor vehicle;
a sliding element slidably received in the side rail;
a spring block inserted within the side rail;
a spring located between the sliding element and the spring block in the side rail;
a front rail removably attached to the sliding element;
a flexible tonneau cover having a front end attached to the front rail;
a rear rail removably attached to the side rail, a rearward end of the flexible tonneau cover being attached to the rear rail, the tonneau cover being rolled up in a longitudinally forward direction around the rear rail when the flexible tonneau cover is in a stored position; and
wherein the spring tensions the flexible tonneau cover in a longitudinally forward direction when the flexible tonneau cover is in a closed position.

15. The flexible tonneau cover assembly of claim 14 wherein the spring has a spring constant between 7,500 N/m and 8,000 N/m.

16. The flexible tonneau cover assembly of claim 15 wherein the spring has a spring constant of 7,880 N/m.

17. The flexible tonneau cover assembly of claim 14 wherein the spring block is attached to the side rail by a fastener.

* * * * *